(12) United States Patent
Milton

(10) Patent No.: US 6,434,878 B1
(45) Date of Patent: Aug. 20, 2002

(54) FISH HOOK HOLDER

(76) Inventor: William R. Milton, 6197 S. Grape Ct., Littleton, CO (US) 80121

( * ) Notice: Subject to any disclaimer, the term of this patent is extended or adjusted under 35 U.S.C. 154(b) by 0 days.

(21) Appl. No.: 09/538,029

(22) Filed: Mar. 29, 2000

(51) Int. Cl.$^7$ .............................. A01K 97/00; D03J 3/00
(52) U.S. Cl. .............................................. 43/4; 289/17
(58) Field of Search ........................ 43/1, 4, 53.5, 57.1; 289/17; 294/3.6, 103.1, 26; 606/144, 148, 139

(56) References Cited

U.S. PATENT DOCUMENTS

| | | | |
|---|---|---|---|
| 2,926,036 A | * 2/1960 | Wimberley ................... | 289/17 |
| 2,934,369 A | * 4/1960 | Kennedy ...................... | 289/17 |
| 3,086,802 A | * 4/1963 | Keeton ......................... | 289/17 |
| 3,101,964 A | * 8/1963 | Reaser ......................... | 289/17 |
| 3,164,067 A | * 1/1965 | Hurst ............................... | 43/4 |
| 3,396,998 A | * 8/1968 | Scoville ....................... | 289/17 |
| 3,419,924 A | * 1/1969 | Archibald ................... | 43/53.5 |
| 3,575,449 A | * 4/1971 | Browning ................... | 289/17 |
| 3,588,078 A | * 6/1971 | Van De Sande ............ | 43/53.5 |
| 3,625,556 A | * 12/1971 | Stromberg .................. | 289/17 |
| 3,877,736 A | * 4/1975 | Zauskey ...................... | 289/17 |
| 3,893,254 A | * 7/1975 | Neck .............................. | 43/1 |
| 3,912,316 A | * 10/1975 | Veech .......................... | 294/1.4 |
| 3,918,757 A | * 11/1975 | Huber ...................... | 294/103.1 |
| 3,965,605 A | * 6/1976 | Allen ............................. | 43/1 |
| 4,068,400 A | * 1/1978 | McCoy ....................... | 43/53.5 |
| 4,077,618 A | * 3/1978 | Durant .................... | 294/103.1 |
| RE29,604 E | * 4/1978 | Matarelli .................... | 289/17 |
| 4,566,213 A | * 1/1986 | Cossin ........................ | 289/17 |
| 4,674,220 A | * 6/1987 | Bearce et al. .................. | 43/4 |
| 4,815,997 A | * 3/1989 | Forsmark et al. ............. | 294/26 |
| 5,092,074 A | * 3/1992 | Zincke ........................ | 43/53.5 |
| 5,161,843 A | * 11/1992 | Baldwin ....................... | 294/26 |
| 5,209,685 A | * 5/1993 | Hammes ....................... | 294/26 |
| 5,310,229 A | * 5/1994 | Hanson ........................ | 294/26 |
| 5,593,196 A | * 1/1997 | Baum et al. ............... | 294/19.1 |
| 5,647,616 A | * 7/1997 | Hamilton .................... | 289/17 |
| 5,791,699 A | * 8/1998 | High ........................... | 289/17 |
| 5,934,009 A | * 8/1999 | Trahan ....................... | 43/53.5 |
| 6,065,787 A | * 5/2000 | Jarosch ....................... | 294/1.1 |

OTHER PUBLICATIONS

"Ty–Rite Jr." printed publication and photographs.

* cited by examiner

Primary Examiner—Darren W. Ark
(74) Attorney, Agent, or Firm—Sheridan Ross P.C.

(57) ABSTRACT

A fish hook holder comprises a cylindrical shape barrel having a plunger inserted therein which is resiliently biased by a spring also residing within the barrel. The holder has a catch positioned near the distal end which can be moved between a retracted and extended position. In the extended position, the plunger is depressed and an object such as the curved portion of a fish hook can be inserted in the gap between the catch and the distal end of the fish hook holder. When the plunger is released, the fish hook is secured between the catch and the distal end of the holder. Because of the cylindrical shape of the barrel, the barrel may be rotated about its longitudinal axis by rolling the barrel between the thumb and finger of a user. Accordingly, the holder not only assists in securing a lure, but also can assist a user in tying a fisherman's knot, or otherwise manipulating the lure for repairs. A sleeve may be placed over the barrel for decoration, or to keep the holder afloat if dropped in water. A lanyard may be attached to the holder so that the holder may be secured to the fisherman's clothing or gear.

10 Claims, 2 Drawing Sheets

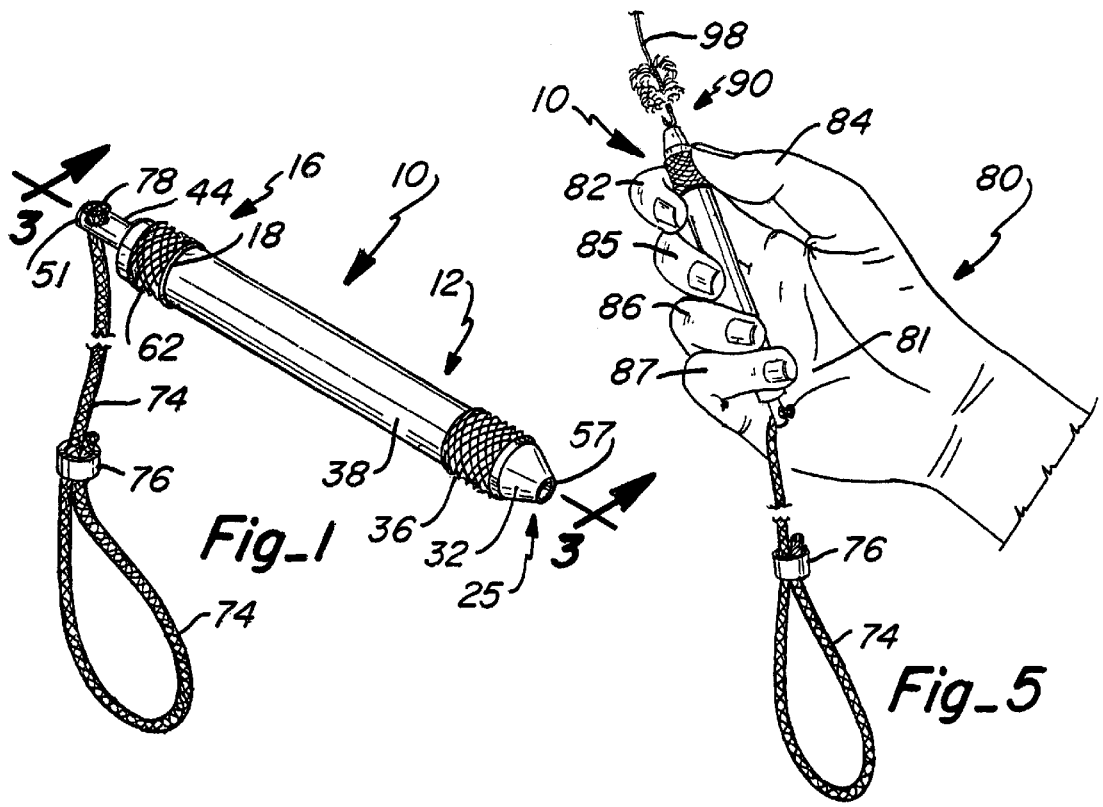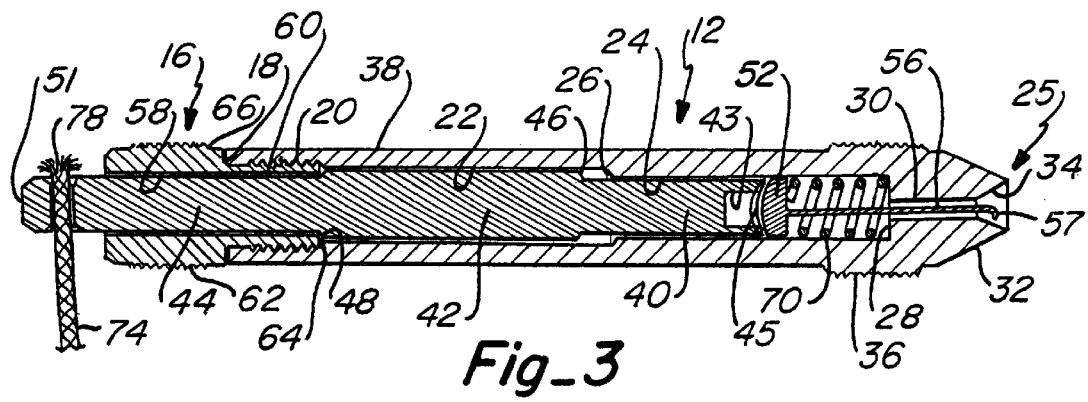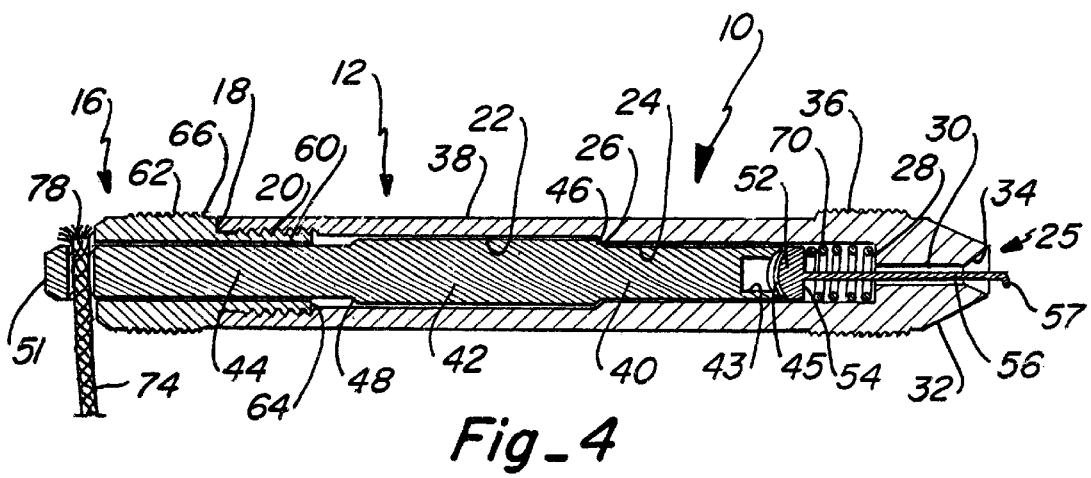

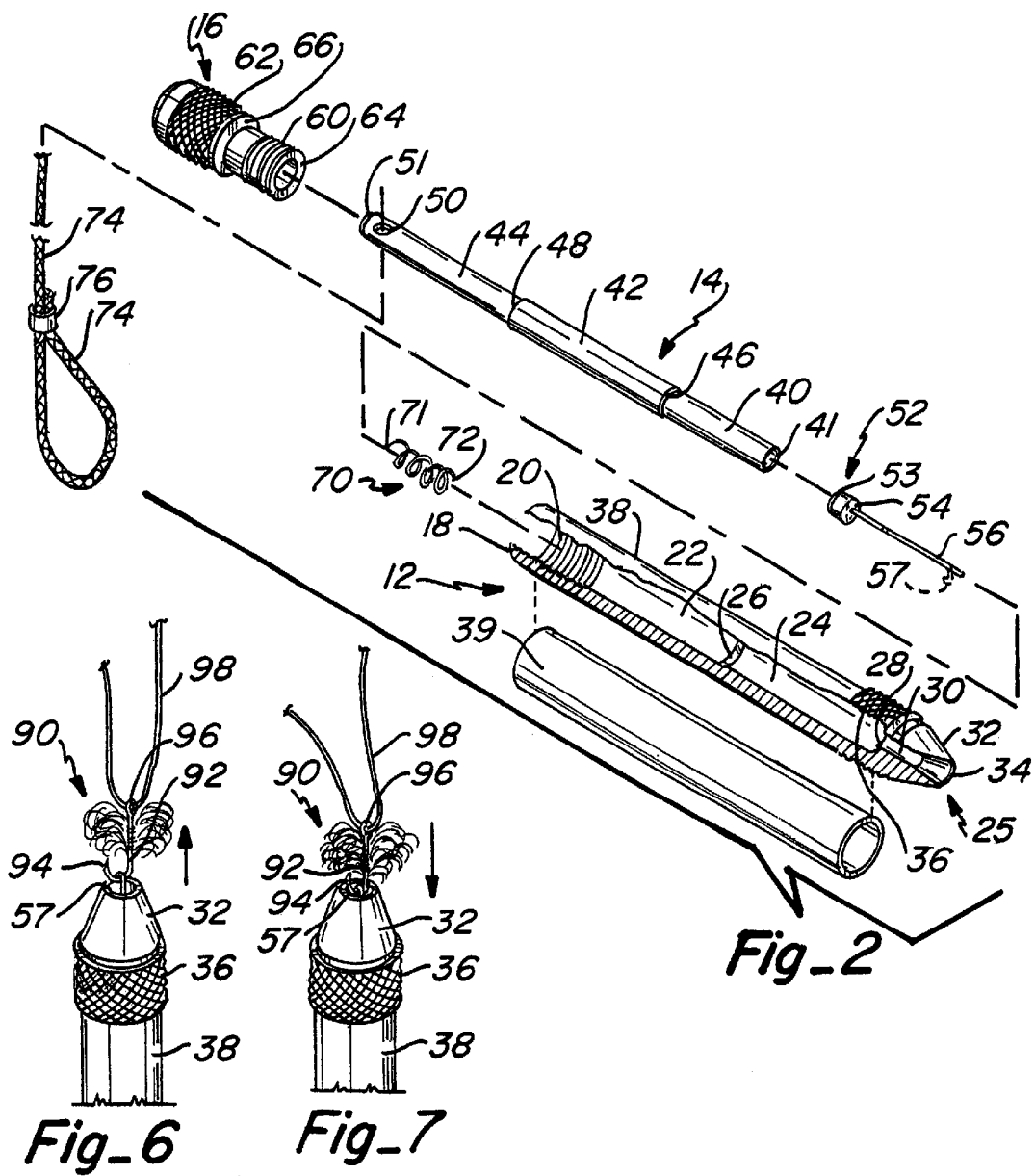
Fig_2
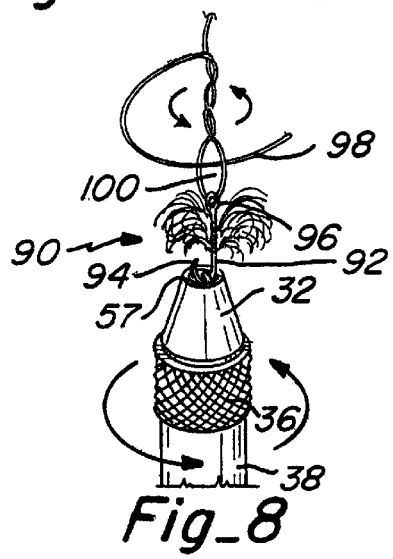
Fig_6  Fig_7
Fig_8

FISH HOOK HOLDER

TECHNICAL FIELD

This invention relates to a holding device and, more particularly, to a holder which releasably holds a fish hook or the fish hook portion of a fishing lure.

BACKGROUND ART

There is a wide array of equipment and equipment accessories which fishermen use in sport fishing. Depending upon the type of fish which are desired to be caught, and depending upon the particular environmental conditions, a fisherman will routinely change the type of lure used during a particular fishing outing. The term "lure" as used throughout includes traditional lures, flies, or any other fishing implement which includes a hook to include a hook with bait. The ease, speed, and safety at which the fisherman may change his/her selection of a lure can improve the quality of the fishing experience, along with minimizing the frustration which is associated with removing and reattaching a particular lure. Lures used in trout fishing particularly have very small hooks and, because of their small size, such lures are difficult to manipulate with the hands. Especially in cold weather conditions or conditions in which the fisherman cannot set aside other fishing gear to concentrate on retying the lure, it often becomes quite difficult to quickly and efficiently remove and reattach a particular lure.

Accordingly, there is a need for a simple, yet effective holder which may hold a lure while the fisherman removes or reattaches the lure to the fishing line. There is also a need for a holder which can not only hold or steady the lure, but also a holder which may assist a fisherman in tying the line to the lure.

DISCLOSURE OF THE INVENTION

The fish hook holder of the invention is a holder which may be held in the hand of a user, and which releasably holds the fish hook portion of a fishing lure so that a fisherman may more easily attach the desired lure to the fishing line. In its simplest form, the fish hook holder has a cylindrical shape barrel, a plunger which is activated at one end of the barrel, and a resiliently biased catch which is used to hold the fish hook portion of the lure. Depressing the plunger moves the catch away from contact with the distal end of the barrel, and allows the curved portion of the hook to be placed in a gap between the catch and the distal end of the barrel. When the plunger is released, the catch retracts, thus holding the hook against the distal end of the barrel. The fisherman may then manipulate the lure so as to attach the fishing line thereto, or to otherwise perform maintenance on the lure. The fish hook holder is sized so that it easily fits within the palm of the hand of the user.

Structurally, the fish hook holder has an opening extending through the barrel to receive the plunger. A spring is placed within the opening of the barrel to provide a biasing force for the movement of the catch which is also anchored within the barrel. An end cap secures the plunger and spring within the barrel. A lanyard may be attached to the holder so that it may be secured to a fisherman. Optionally, a sleeve may be place over the barrel for flotation or for identification or promotional purposes. The sleeve may be made of a buoyant material which prevents the holder from sinking if it is dropped in the water. Alternatively, the sleeve may be coated with a luminescent material so that it glows in low light conditions. The distal end of the barrel from which the catch protrudes is countersunk to better hold the curved portion of the fish hook. The barrel of the holder may have knurled portions which assist a user in gripping the holder.

These advantages, along with others, will be apparent from the following detailed description, taken in conjunction with the accompanying drawings.

BRIEF DESCRIPTION OF THE DRAWINGS

FIG. 1 is a perspective view of the fish hook holder of this invention;

FIG. 2 is a fragmentary exploded perspective view of the components of the fish hook holder of this invention;

FIG. 3 is a vertical cross section, taken along line 3—3 of FIG. 1, further illustrating the components of the invention, and showing the fish hook holder catch in a retracted position;

FIG. 4 is another vertical cross section, taken along line 3—3 of FIG. 1, showing the plunger depressed causing the catch to move in a distal direction, thus constituting the extended position of the catch;

FIG. 5 is a perspective view of a user holding the fish hook holder of the invention; and FIGS. 6–8 are enlarged fragmentary perspective views of the distal end of the fish hook holder illustrating the fish hook holder securing a lure, and further illustrating a method by which fishing line is attached to the lure in accordance to a method of this invention.

DETAILED DESCRIPTION OF THE DRAWINGS

As shown in FIGS. 1 and 2, the fish hook holder 10 comprises a few major components, namely, a barrel 12, a plunger 14 inserted within the barrel, and an end cap 16 which secures the plunger within the barrel. The open proximal end 18 of the barrel 12 is adapted to receive the threaded end of the end cap 16, as further discussed below. Accordingly, the open proximal end 18 has a tapped interior section 20. As seen in FIGS. 2–4, the opening which extends through the barrel 12 includes a first cylindrical bore section 22 which extends along the central or mid portion of the barrel 12, a second smaller cylindrical bore section 24 which communicates with the first bore section and extends distally toward the distal end 25 of the barrel. The transition between first bore section 22 and second bore section is 24 is defined by shoulder 26. The opening further includes a third cylindrical bore section 30 which extends distally from the second bore section, and communicates with the distal end 25 of the barrel 12. The third bore section is a smaller hole or opening in comparison to bore sections 22 and 24. The transition between second bore section 24 and third bore section 30 is defined by shoulder 28. The exterior surface of the distal end 25 of barrel 12 includes a cone-shaped section 32. Third bore section 30 communicates with countersink 34 which is formed at the distal end 25 of the barrel 12, as best seen in FIG. 2–4. Adjacent cone-shaped section 32 is a raised knurled section 36 which enhances a user's ability to grip the holder 10. A raised knurled section is but one method by which the exterior surface can be roughened to enhance gripping ability. A smooth outer surface 38 then extends from knurled section 36 proximally to the proximal end 18. Optionally, a sleeve 39 may fit over the smooth outer surface 38. Sleeve 39 is simply a cylindrical shaped component which can be made of a buoyant material, or can be made of a material which is engraved with a name, advertising or the like.

Now referring to the plunger 14, shown in FIGS. 2–4, it includes a distal end 41 which has a counter bore or recess 43, and curved contact surfaces 45 which are adapted to received the curved base surface 53 of spring cap 52, as further discussed below. A main plunger section 42 interconnects proximal plunger section 44 and distal plunger section 40. First flange 46 defines the interface between distal plunger section 40 and main plunger section 42, while second flange 48 defines the interface between proximal plunger section 44 and the opposite end of main plunger section 42. An opening 50 may be drilled transversely through the plunger near the proximal end 51 thereof As discussed further below, a lanyard 74 may be attached to the holder through opening 50.

Now referring back to FIG. 2, a spring cap 52 resides within the second bore section 24 to stabilize spring or resilient member 70 within the barrel. The spring or resilient member 70 may be any well-known helical type spring. The spring cap 52 includes a base surface 53, and a spring engaging surface 54 opposite the base surface 53. Catch 56 has one end secured to and extending from engaging surface 54. As shown in FIG. 2, the catch 56 is a straight wire-like member when the holder is being assembled. When the holder is assembled, the distal curved tip 57 is formed by bending the free end of catch 56 which protrudes distally beyond third bore section 30.

Again referring to FIGS. 2–4, the end cap 16 has a central bore 58 extending longitudinally therethrough. A set of threads 60 are formed on the distal end of the end cap 16. The proximal end of the end cap includes a knurled section 62. A flange 66 defines the area between knurled section 62, and threads 60. When assembled, the distal end 72 of spring 70 abuts shoulder 28 within the second bore section 24. Catch 56 is inserted through the longitudinal opening in spring 70, extends through third bore section 30, and adjacent to the countersink 34. The distal end 57 of catch 56 is bent so as to be able to secure the fish hook. The proximal end 71 of spring 70 is seated against spring engaging surface 54 of spring cap 52. The plunger 14 is then inserted through the barrel 12 wherein the curved surfaces 45 of plunger tip 41 engage the base surface 53 of spring cap 52. The end cap 16 is then screwed on the proximal end 18 of the barrel as by threads 60 engaging the tapped interior surface 20.

In the retracted position of the catch 56 as shown in FIG. 3, spring 70 causes the plunger 14 to be pushed proximally such that second flange 48 of the plunger contacts the distal end 64 of the end cap 16. When the proximal end 51 of the plunger is depressed in the distal direction, as shown in FIG. 4, spring 70 is compressed causing the plunger to move distally, thus also causing the curved distal tip 57 of the catch 56 to move distally to the extended position. The distal travel of the plunger 14 within the barrel 12 is limited by the contact of first flange 46 with shoulder 26. Referring now to FIGS. 6 and 7, when the plunger is depressed as shown in FIG. 4, the curved hook portion 94 of a fish hook 90 may be inserted in the gap between the curved distal tip 57 and the countersink 34. When the plunger is released, the distal tip 57 retracts, thus holding the fish hook 90 in place. The conical shape of countersink 34 causes the shank 92 of the fish hook 90 to naturally extend in a longitudinal direction with respect to the barrel 12, and countersink 34 further helps to stabilize the hook 90 when attached.

A lanyard 74 may be secured to the holder 10 through opening 50 in the plunger 14. As best seen in FIGS. 3 and 4, a knot 78 is formed on one end of the lanyard 74, or that end of the lanyard may simply be burned so as to enlarge the end so it cannot pass back through opening 50. The other end of the lanyard 74 may be folded back over itself and secured as by clip 76 forming a loop. The looped end of the lanyard 74 may then be secured to a belt loop, or secured somewhere on the fisherman's clothing as desired.

As shown in FIG. 5, the holder 10 is sized to fit within a user's hand 80. The end cap 16 is placed in the palm 81, and the distal end of the holder extends toward the forefinger 82 and thumb 84. The third, fourth and fifth fingers 85–87 can wrap around the middle section of the barrel 12. When it is desired to attach a fishing lure to a length of fishing line 98, the plunger is depressed causing the curved distal tip of catch 57 to move distally beyond the countersink 34, as shown in FIG. 6. The curved portion of the hook 94 is then inserted in the gap between the curved distal tip 57 and the countersink 34. The plunger is released causing the curved distal tip to retract thus securing the fish hook 90 to the holder 10, as shown in FIG. 7. Then, the line 98 may be routed through the eye 96 of the hook 90. When the hand 80 is in the position as shown in FIG. 5, the holder 10 may be rotated either in a clockwise or counterclockwise direction by rolling the holder 1I between the forefinger 82 and thumb 84. As shown in FIGS. 6–8, one knot for tying the line to the lure involves twisting the fishing line 98 back upon itself, and then inserting the free end of the fishing line through an opening 100 created adjacent the eye 96 of the fish hook. The free end of the fishing line 98 is then pulled tight to create the knot. This is but one type of knot which can be more easily tied by use of the fish hook holder of this invention. Because the holder can be rolled between the fingers of a user, the fishing line may easily be manipulated without having to hold the hook portion of the lure within the fingers.

Although the holder of this invention has specific utility with regard to securing fishing line to a lure, the holder may also be used to otherwise repair or adjust the lure as necessary. For example, it may be necessary to repair the ornamentation on the lure. Accordingly, the holder of this invention is ideal for holding the lure while undergoing repair. Those skilled in the art can think of many other specific uses in which the holder of this invention lends itself This invention has been described in detail with reference to a particular embodiment thereof, but it will be understood that various other modifications can be effected within the spirit and scope of this invention.

What is claimed is:

1. A fish hook holder comprising:
a barrel extending along a longitudinal axis and having an opening extending therethrough, said barrel having a proximal end and a distal end;
a catch secured within said opening near said distal end of said barrel, said catch being movable between a retracted position and a extended position;
means for resiliently moving said catch between said retracted position and said extended position; and
a sleeve mounted over said barrel between said proximal end and said distal end thereof, said sleeve being made of a buoyant material.

2. A fish hook holder comprising:
a barrel extending along a longitudinal axis and having an opening extending therethrough, said barrel having a cylindrical shape and a continuous unbroken outer surface without transverse openings formed therethrough at any point along said axis adapted to receive a finger of a user, said barrel further having a proximal end and a distal end, said distal end having a continuous unbroken outer edge and a countersunk surface forming a conical shaped opening, said conical shaped opening being defined by a pair of opposing surfaces each extending substantially in a straight line and converging toward one another when viewing said conical shaped opening in cross-section;

a catch secured within said opening near said distal end of said barrel, said catch being movable between a retracted position and a extended position, said catch extending along the longitudinal axis of the barrel, said catch having a distal end remaining in line with said barrel in both the retracted and extended positions;

means for resiliently moving said catch between said retracted position and said extended position; and wherein said conical shaped opening is sized to receive different sized fish hooks so that a curved portion of the fish book contacts the countersunk surface at a location corresponding to the particular size of the fish hook.

3. A fish hook holder for securing a fish hook comprising:

a barrel extending along a longitudinal axis, and having an opening extending through said barrel and along said longitudinal axis, said barrel having a cylindrical shape and a continuous unbroken outer surface without transverse openings formed therethrough at any point along said axis adapted to receive a finger of a user, said barrel further having a proximal end and a distal end, said distal end having a continuous unbroken outer edge and a countersunk surface forming a conical shaped opening, said conical shaped opening being defined by a pair of opposing surfaces each extending substantially in a straight line and converging toward one another when viewing said conical shaped opening in cross-section;

a catch having a proximal end secured within said opening of said barrel near said distal end thereof, and being movable between a retracted position and an extended position, said catch extending along the longitudinal axis of the barrel, and said catch having a distal end remaining in line with said barrel in both the retracted and extended positions;

a plunger inserted within said opening of said barrel, said plunger having a distal end communicating with said proximal end of said catch secured within said opening, and said plunger having a proximal end extending adjacent to said proximal end of said barrel;

a resilient member secured in said opening of said barrel adjacent said distal end of said plunger and adjacent said catch;

an end cap mounted to said proximal end of said barrel for securing said plunger within said barrel; and wherein said proximal end of said plunger may be depressed causing said catch to move from said retracted position to said extended position, and said catch returning to said retracted position by the force of said resilient member when said plunger is released enabling said distal end of said catch to hold the fish hook when it is positioned at said distal end of said barrel, and wherein said conical shaped opening is sized to receive different sized fish hooks so that a curved portion of the fish hook contacts the countersunk surface at a location corresponding to the particular size of the fish hook.

4. A holder, as claimed in claim 3, wherein:

at least a portion of said outer surface is roughened to enhance gripping.

5. A holder, as claimed in claim 3, further including:

a lanyard attached to said proximal end of said plunger.

6. A holder, as claimed in claim 3, further including:

a spring cap attached to said proximal end of said catch, and placed in said barrel and in communication with said spring to secure said spring within said barrel.

7. A holder, as claimed in claim 3, further including:

a sleeve mounted over said barrel between said proximal end and said distal end thereof.

8. A holder, as claimed in claim 3, wherein:

said spring is mounted over said catch within said barrel.

9. A fish hook holder, as claimed in claim 3, comprising:

a roughened section formed on said outer surface adjacent said distal end, said roughened section for grasping by the user to selectively spin said barrel by rolling the barrel between a finger and thumb of the hand.

10. A fish hook holder, as claimed in claim 3, comprising:

a sleeve mounted over said barrel between said proximal end and said distal end thereof, said sleeve being luminescent to glow in low light conditions.

* * * * *

UNITED STATES PATENT AND TRADEMARK OFFICE
CERTIFICATE OF CORRECTION

PATENT NO. : 6,434,878 B1  
DATED : August 20, 2002  
INVENTOR(S) : Milton

It is certified that error appears in the above-identified patent and that said Letters Patent is hereby corrected as shown below:

<u>Column 5,</u>
Line 14, please replace "book" with -- hook --.

Signed and Sealed this

Third Day of December, 2002

JAMES E. ROGAN
*Director of the United States Patent and Trademark Office*